(12) United States Patent
Meiri et al.

(10) Patent No.: US 8,335,899 B1
(45) Date of Patent: Dec. 18, 2012

(54) ACTIVE/ACTIVE REMOTE SYNCHRONOUS MIRRORING

(75) Inventors: David Meiri, Cambridge, MA (US); Dan Arnon, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 811 days.

(21) Appl. No.: 12/080,027

(22) Filed: Mar. 31, 2008

(51) Int. Cl.
*G06F 12/00* (2006.01)

(52) U.S. Cl. ............................... 711/162; 711/E12.001

(58) Field of Classification Search .................. None
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,484,173 B1 | 11/2002 | O'Hare et al. | |
| 6,697,367 B1 | 2/2004 | Halstead et al. | |
| 6,862,632 B1 | 3/2005 | Halstead et al. | |
| 6,976,139 B2 | 12/2005 | Halstead et al. | |
| 7,000,086 B2 | 2/2006 | Meiri et al. | |
| 7,054,883 B2 | 5/2006 | Meiri et al. | |
| 7,088,703 B2 | 8/2006 | O'Hare et al. | |
| 7,380,082 B2 | 5/2008 | Meiri et al. | |
| 7,600,088 B1 * | 10/2009 | Clark et al. | 711/162 |
| 2001/0051955 A1 * | 12/2001 | Wong | 707/201 |
| 2005/0071585 A1 * | 3/2005 | Hayardeny et al. | 711/162 |
| 2005/0251633 A1 * | 11/2005 | Micka et al. | 711/162 |
| 2006/0236061 A1 * | 10/2006 | Koclanes | 711/170 |
| 2007/0011424 A1 * | 1/2007 | Sharma et al. | 711/165 |

* cited by examiner

*Primary Examiner* — Edward Dudek, Jr.
*Assistant Examiner* — John P Fishburn
(74) *Attorney, Agent, or Firm* — Muirhead and Saturnelli LLC

(57) ABSTRACT

An active/active remote mirroring system, for example an active/active SRDF system, provides for remote mirroring between multiple storage volumes, e.g., a first storage device and a second storage device, in which the storage devices may both be active. A plurality of hosts may be coupled to either the first storage device, the second storage device, or both to conduct read and write operations from and to the storage devices, for example to nearest device. The hosts may be part of an application cluster. The first storage device and the second storage device may be connected via a link, such as an SRDF link, for providing remote mirroring capabilities between the storage volumes. In various embodiments the first and second storage devices may be separate devices, volumes, or portions thereof, and/or may be different portions of the same storage device.

15 Claims, 9 Drawing Sheets

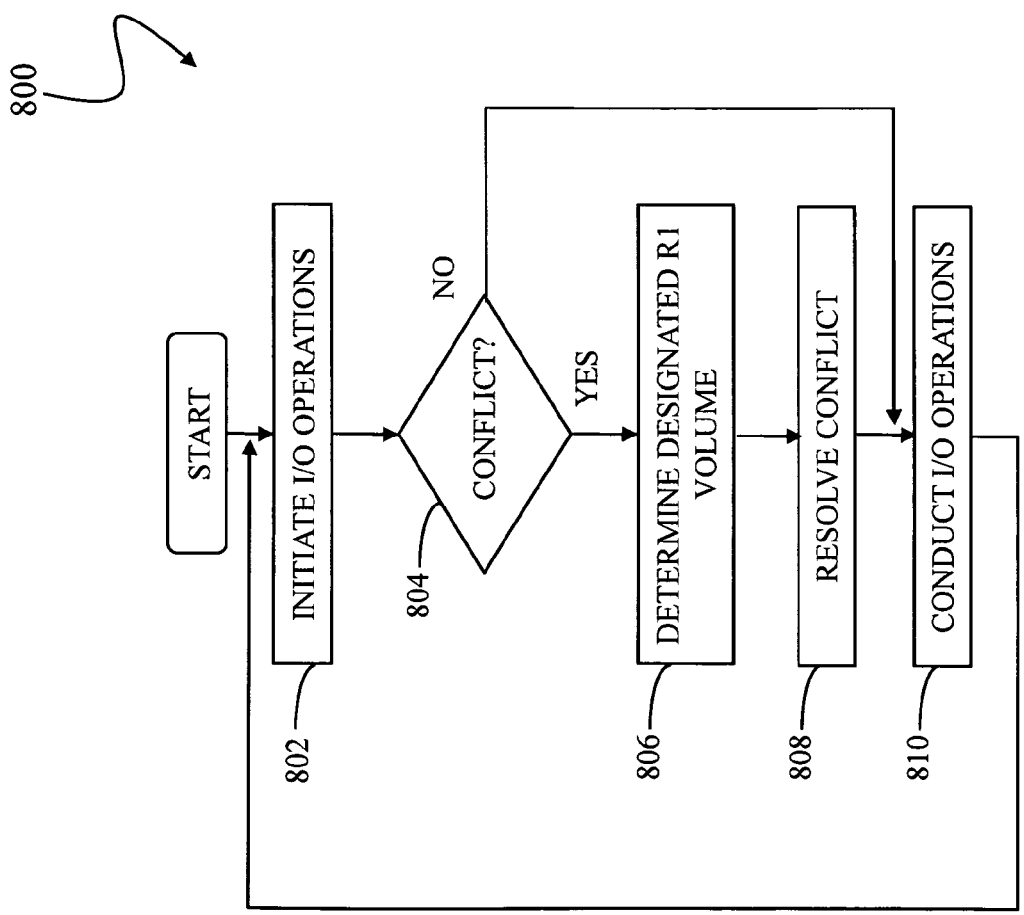

ACTIVE/ACTIVE REMOTE SYNCHRONOUS MIRRORING

TECHNICAL FIELD

The present application is related to the field of data storage for computers and, more particularly, to transfer of data among storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

There may be a number of different types of RDF transmission. Synchronous RDF mode allows synchronous data transfer where, after an initial data write from a host to a primary storage device, the data is transferred from the primary storage device to a secondary storage device using RDF. Receipt of the data is acknowledged by the secondary storage device to the primary storage device which then provides a write acknowledge back to the host for the initial data write. Thus, in synchronous RDF mode, the host does not receive a write acknowledge from the primary storage device until the RDF transfer to the secondary storage device has been completed and acknowledged by the secondary storage device. One product that allows for synchronous data transfers is produced by EMC Corporation of Hopkinton, Mass. and known as SRDF/S, which is further discussed elsewhere herein.

A drawback to synchronous RDF transmission may be that the latency of each of the write operations is increased by waiting for the acknowledgement of the RDF transfer. This problem is exacerbated when there is a long distance between the primary storage device and the secondary storage device; because of transmission delays, the time delay required for making the RDF transfer and then waiting for an acknowledgement back after the transfer is complete may be undesirable.

Another possibility for an RDF system is to have the host write data to the primary storage device and have the primary storage device copy data asynchronously to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate latency problems associated with synchronous and semi-synchronous data transfer modes, a difficulty still exists because there cannot be a guarantee of data consistency between the primary and secondary storage devices. If there are problems, such as a failure of the primary system, the secondary system may have stored therein out-of-order changes that make the data unusable.

One solution to the above-noted problems is a product by EMC Corporation known as SRDF/A in which data sets are transferred to the secondary array at defined intervals. Using SRDF/A, data to be copied from one storage array to another in chunks that are assigned sequence numbers based on when the data was written by the host. The data chunks are then separately transmitted according to the sequence number. Although the remote copy of the data may not be as current as the primary copy, SRDF/A allows replication of data over considerable distances in a manner that avoids the latency issues of synchronous transfers and has reduced bandwidth requirements. Moreover, data ordering problems associated with other types of remote data synchronous transfers are avoided. For further discussion of SRDF/A systems and techniques, see U.S. Pat. Nos. 7,000,086 to Meiri, et al., entitled "Virtual Ordered Writes," and 7,054,883 to Meiri, et al. entitled "Virtual Ordered Writes for Multiple Storage Devices," which are both incorporated herein by reference.

Current data replication/mirroring systems may require active/passive operational behavior, meaning that reads and writes from a host occur on one primary storage volume (active), e.g., R1, while host writes may be disabled and reads may be infrequent at the secondary storage volume (passive), e.g., R2. The active R1 controls writes to the passive R2 in a process that may result in issues of currentness/correctness of the data at R2, as noted above. Further, an explicit failover operation is required to activate R2 in the case of failure of R1. Active/passive behavior may be disadvantageous in some situations, in particular for clustered applications in which applications and individual processes may move between servers needing R1 and R2 to be active at the same time, and in which a level of symmetry between the storage volumes may be required that is not effectively achievable with an active/passive system. Existing active/active solutions may require server mirroring and require server CPU cycles and use of the server's network.

Accordingly, it would be desirable to provide for a system that allows for an enhanced data replication and/or mirroring system and that allows more efficient operations and use of storage devices in the system.

SUMMARY OF THE INVENTION

According to the system described herein, an active/active mirroring system includes a first storage device, a second storage device coupled to the first storage device, where each of the first storage device and the second storage device are accessible for I/O operations by at least one host, and where the first storage device and the second storage device control mirroring operations that mirror data between each of the first storage device and the second storage device. At least one host may be part of a cluster. The mirroring operations between the first storage device and the second storage device may be synchronous with the I/O operations of the host. There may be a plurality of hosts and wherein at least one of the hosts is coupled to only one of: the second storage device and the first storage device. At least a first portion of the first storage device may receive the I/O operations from the at least one host, and at least a second portion of the first storage device may include mirrored data received from the second storage device. At least a first portion of the second storage device may receives the I/O operations from the at least one host, and at least a second portion of the second storage device may include mirrored data received from the first storage device. In response to failure of one of the first storage device and the second storage device, the at least one host may direct the I/O operations to the other of the first storage device and the second storage device. One of the first storage device and the second storage device may be designated as a primary storage device. In response to failure of a communication link between the first storage device and the second storage device, the at least one host may direct the I/O operations to the designated primary storage device. In response to a lock conflict between the first storage device and the second storage device, the conflict may be resolved according to the designated primary storage device.

According further to the system described herein, active/active mirroring includes providing a first storage device, providing a second storage device coupled to the first storage device, receiving I/O operations at the first storage device and the second storage device from at least one host, and controlling mirroring operations at the first storage device and the second storage device to mirror data between each of the first storage device and the second storage device. At least one host may be part of a cluster. The mirroring operations between the first storage device and the second storage device may be synchronous with the I/O operations of the host. There may be a plurality of hosts and at least one of the hosts may be coupled to only one of: the second storage device and the first storage device. In response to failure of one of the first storage device and the second storage device, the at least one host may direct the I/O operations to the other of the first storage device and the second storage device. Active/active mirroring may also include designating one of the first storage device and the second storage device as a primary storage device. In response to failure of a communication link between the first storage device and the second storage device, the at least one host may direct the I/O operations to the designated primary storage device. In response to a lock conflict between the first storage device and the second storage device, the lock conflict may be resolved according to the designated primary storage device.

According further to the system described herein, computer software, stored on a computer-readable medium provides active/active mirroring. The software includes executable code that controls a first storage device, executable code that controls a second storage device coupled to the first storage device, executable code that receives I/O operations at the first storage device and the second storage device from at least one host, and executable code that controls mirroring operations at the first storage device and the second storage device to mirror data between each of the first storage device and the second storage device. The mirroring operations between the first storage device and the second storage device may be synchronous with the I/O operations of the host. In response to failure of one of the first storage device and the second storage device, executable code may direct the I/O operations of the at least one host to the other of the first storage device and the second storage device. In response to failure of a communication link between the first storage device and the second storage device, executable code may direct the I/O operations of the at least one host to a designated primary storage device. In response to a lock conflict between the first storage device and the second storage device, the conflict is resolved according to a designated primary storage device.

BRIEF DESCRIPTION OF THE DRAWINGS

Embodiments of the system are described with reference to the several figures of the drawings, noted as follows.

FIG. 9 is a flow diagram showing lock conflict resolution in an active/active mirroring system according to an embodiment of the system described herein.

DETAILED DESCRIPTION OF VARIOUS EMBODIMENTS

Figure 1:
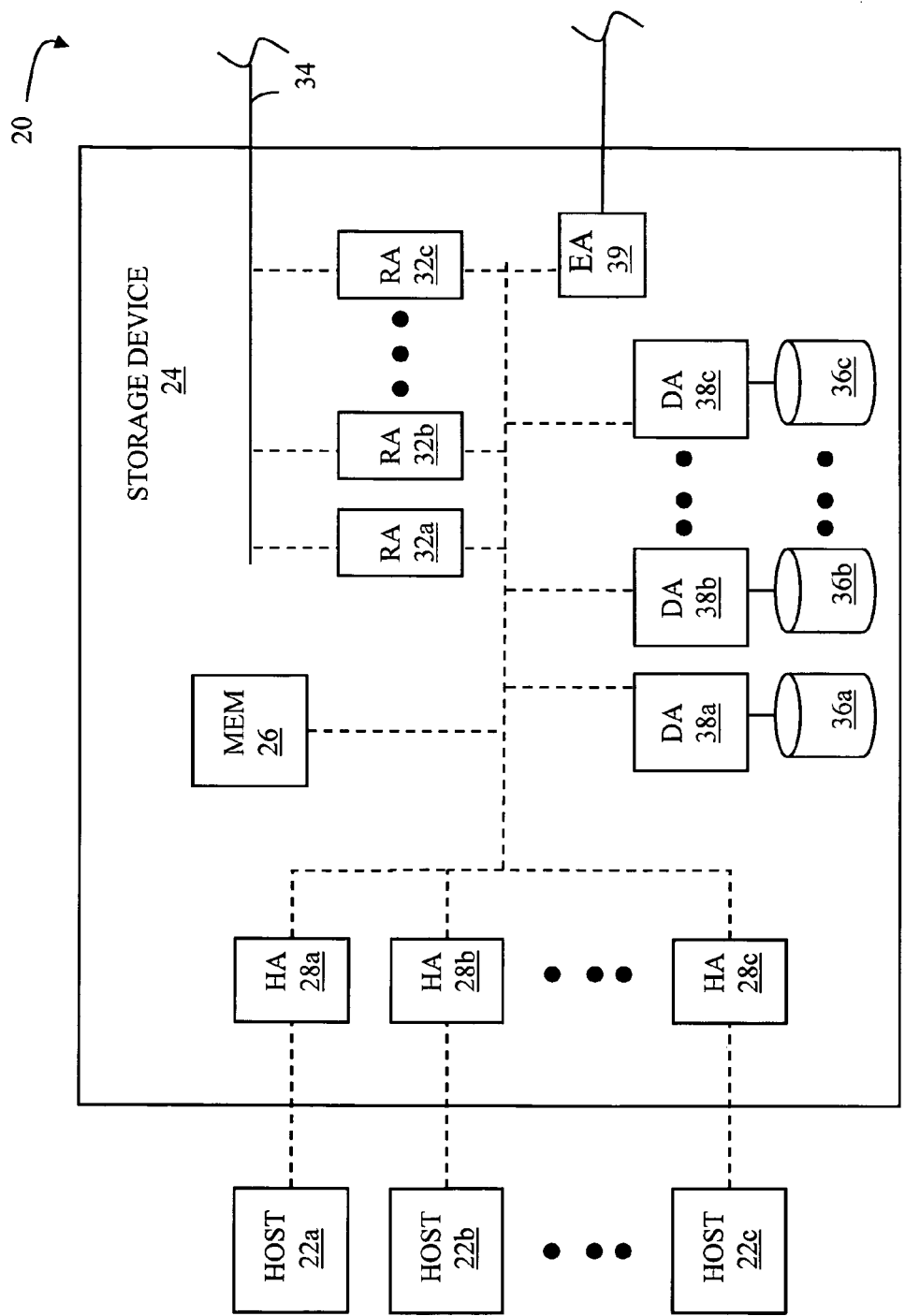
FIG. 1 is a schematic diagram showing a plurality of hosts and a data storage device that may be used in connection with an embodiment of the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

In FIG. 1, a diagram 20 shows a plurality of hosts 22a-22c coupled to a data storage device 24 that may be used in connection with an embodiment of the system described herein. The data storage device 24 includes an internal memory 26 that facilitates operation of the storage device 24 as described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 34 and are similar to the HA's 28a-28c, but are used to transfer data between the storage device 24 and other storage devices that are also coupled to the RDF link 34. The storage device 24 may be coupled to additional RDF links (not shown) in addition to the RDF link 34. For further discussion of RDF and the use thereof in data communication and storage techniques, see U.S. Pat. No. 5,742,792 to Yanai, et al., which is incorporated herein by reference.

The storage device 24 may also include one or more disks 36a-36c, each containing a different portion of data stored on the storage device 24. The disk drives 36a-36c should be understood as representing any appropriate type of storage media, including, without limitation, DRAM cache, flash or other solid-state storage device, tape, optical media, and/or any combination of permanent, semi-permanent and temporally-limited storage media. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk. The storage device may also include an external storage adaptor (EA) 39 that may be used to communicate with one or more other storage devices that could either be the same type of storage device as the storage device 24 or could be a different type of storage device. In various embodiments, additional RA's and/or EA's may be incorporated into the storage device 24.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) may exist between the DA's 38a-38c, the HA's 28a-28c, the RA's 32a-32c, the EA 39 and/or the memory 26. In some embodiments, one or more internal busses and/or communication modules may be used. In some embodiments, the memory 26 may be used to facilitate data transferred between the DA's 38a-38c, the HA's 28a-28c, the RA's 32a-32c and/or the EA 39. The memory 26 may contain tasks that are to be performed by one or more of the DA's 38a-38c, the HA's 28a-28c, the RA's 32a-32c, the EA 39 and a cache for data fetched from one or more of the disks 36a-36c. Use of the memory 26 is further described elsewhere herein.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software and/or executable code may be stored in an appropriate storage medium and executed by one or more processors.

Figure 2:
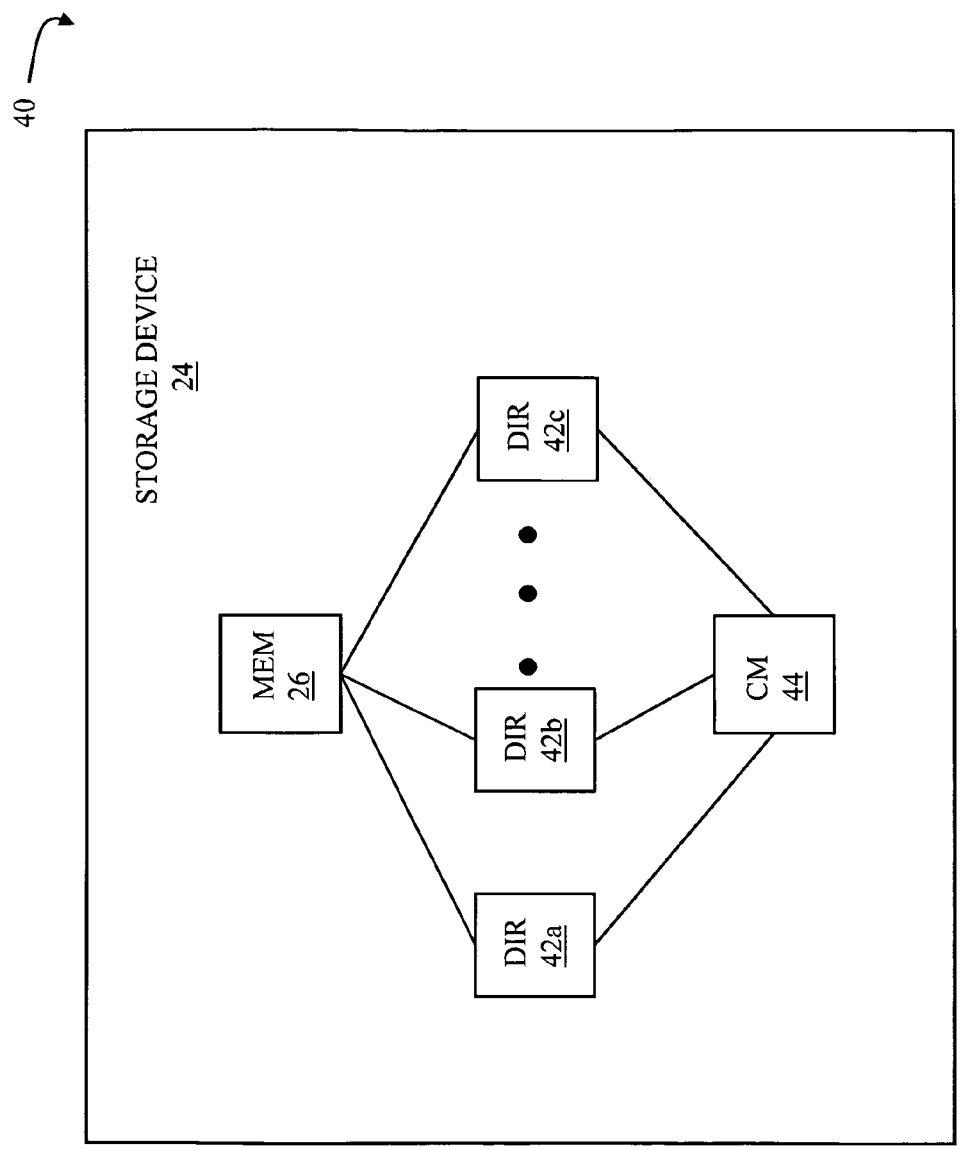
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a, 42b, 42c are coupled to the memory 26. Each of the directors 42a-c may represent one of the HA's 28a-28c, RA's 32a-32c, DA's 38a-38c and/or EA 39. In an embodiment disclosed herein, there may be up to sixty four directors coupled to the memory 26. Of course, for other embodiments, there may be a higher or lower maximum number of directors that may be used.

The diagram 40 also shows an optional communication module (CM) 44 that provides an alternative communication path between the directors 42a-c. Each of the directors 42a-c may be coupled to the CM 44 so that any one of the directors 42a-c may send a message and/or data to any other one of the directors 42a-c without needing to go through the memory 26. The CM 44 may be implemented using conventional MUX/router technology where a sending one of the directors 42a-c provides an appropriate address to cause a message and/or data to be received by an intended receiving one of the directors 42a-42c. Some or all of the functionality of the CM 44 may be implemented using one or more of the directors 42a-c so that, for example, the directors 42a-c may be interconnected directly with the interconnection functionality being provided on each of the directors 42a-c. In addition, a sending one of the directors 42a-c may be able to broadcast a message to all of the other directors 42a-c at the same time.

In some embodiments, one or more of the directors 42a-c may have multiple processor systems thereon and thus may be able to perform functions for multiple directors. In some embodiments, at least one of the directors 42a-c having multiple processor systems thereon may simultaneously perform the functions of at least two different types of directors (e.g., an HA and a DA). Furthermore, in some embodiments, at least one of the directors 42a-c having multiple processor systems thereon may simultaneously perform the functions of at least one type of director and perform other processing with the other processing system. In addition, all or at least part of the memory 26 may be provided on one or more of the directors 42a-c and shared with other ones of the directors 42a-c.

Figure 3:
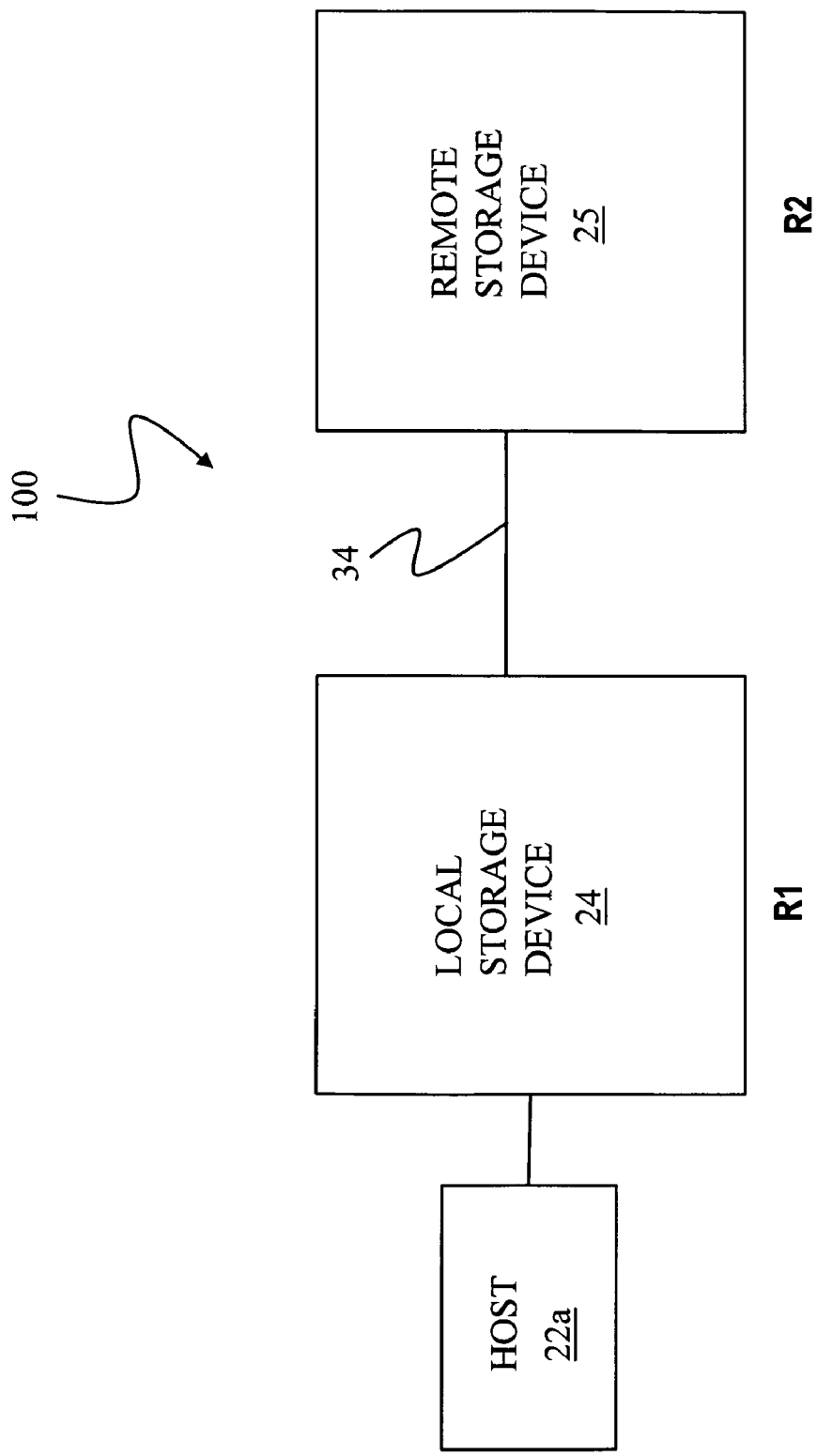
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 100 including the storage device 24, as a local storage device, coupled to a remote storage device 25 via the RDF link 34. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25, and thus is not identical.

Providing an RDF mapping between portions of the local storage device 24 and the remote storage device 25 involves setting up a logical device on the remote storage device 25 that is a remote mirror for a logical device on the local storage device 24. One or more of the hosts 22a-c, for example the host 22a, may read and write data from and to the logical device on the local storage device 24 and the RDF mapping causes modified data to be transferred from the local storage device 24 to the remote storage device 25 using the RA's, 30a-30c, similar RA's on the remote storage device 25 and the RDF link 34. In steady state operation, the logical device on the remote storage device 25 contains data that is identical to the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host reads and writes data from and to the R1 volume and RDF handles automatic copying and updating of the data from the R1 volume to the R2 volume and/or from the R2 volume to the R1 volume in accordance with the system described herein.

In an embodiment, the system described herein may be used in connection with SRDF synchronous (SRDF/S) transfers. For a SRDF/S transfer, data written from one of the hosts 22a-c to the local storage device 24 may be stored locally, for example on one of the data volumes 36a-c of the local storage device 24. After data is written from one or more of the hosts 22a-c to the local storage device 24, the data is transferred from the local storage device 24 to the remote storage device 25 using RDF. Receipt by the remote storage device 25 is then acknowledged to the local storage device 24 which then provides an acknowledge back to the appropriate one of the hosts 22a-c for the initial write. In other embodiments, the system described herein may also be used in connection with other modes of data transfer, including, or in combination with, asynchronous (SRDF/A) transfers and/or other similar data transfer systems and devices.

Figure 4:
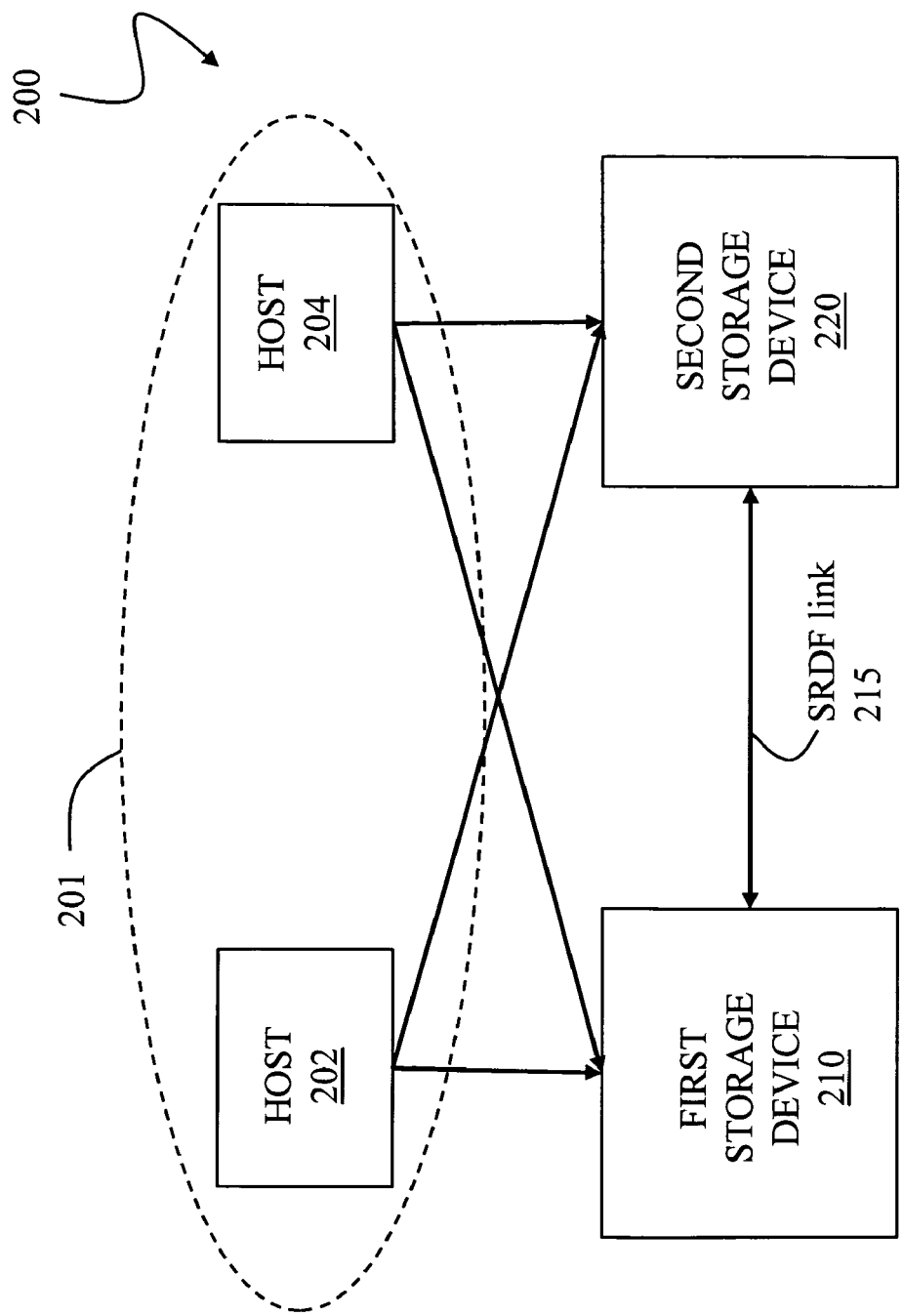
FIG. 4 is a schematic illustration of an active/active mirroring system according to an embodiment of the system described herein.

FIG. 4 is a schematic illustration of an active/active mirroring system 200, for example an active/active SRDF system, according to an embodiment of the system described herein. The system 200 provides for remote mirroring where multiple storage volumes, e.g., a first storage device 210 and a second storage device 220, may be active at the same time. A plurality of hosts 202, 204 may be coupled to the first storage device 210 and the second storage device 204 to conduct read and write operations from and to the storage devices 210, 220, for example to the nearest device. In various embodiments, the plurality of hosts 202, 204 may be coupled to the storage devices 210, 220 directly and/or via a network, such as the Internet, an intranet and/or other suitable network The hosts 202, 204 may be part of a cluster 201, which may be formed by a group of hosts and/or applications connected together, for example, via a local area network and/or other network. As illustrated, in accordance with the system described herein, the first storage device 210 and the second storage device 220 may be connected via a link 215, such as an SRDF link, for providing remote mirroring capabilities between the storage volumes 210, 220. The link 215 provides for reads and writes between each of the storage volumes 210, 220 in an active/active SRDF operation with respect to the storage volumes 210, 220, as further discussed elsewhere herein. In various embodiments, the first and second storage devices 210, 220 may be separate devices, volumes, or portions thereof, and/or may be different portions of the same storage device. The devices may include physical devices and/or logical volumes, for example, identified as Logical Unit Numbers (LUNs).

In an embodiment, each of the storage devices 210, 220 may be treated like an active storage device (e.g., an R1 volume) by one or more of the hosts 202, 204. For example, the host 202 may treat the first storage device 210 as a local storage device (R1) and the second storage device 220 as a remote storage device (R2) while the host 204 may treat the second storage device 220 as a local storage device (R1) and the first storage device 210 as a remote storage device (R2). Further, each of the hosts 202, 204 may also be coupled to both the first storage device 210 and the second storage device 220 to provide automatic failover in the case of failure of one or more of the storage devices 210, 220, or a link thereto, as further discussed elsewhere herein. In the case of failover, each of the hosts 202, 204 may continue to work with the non-failing device with no interruption in service.

Figure 5:
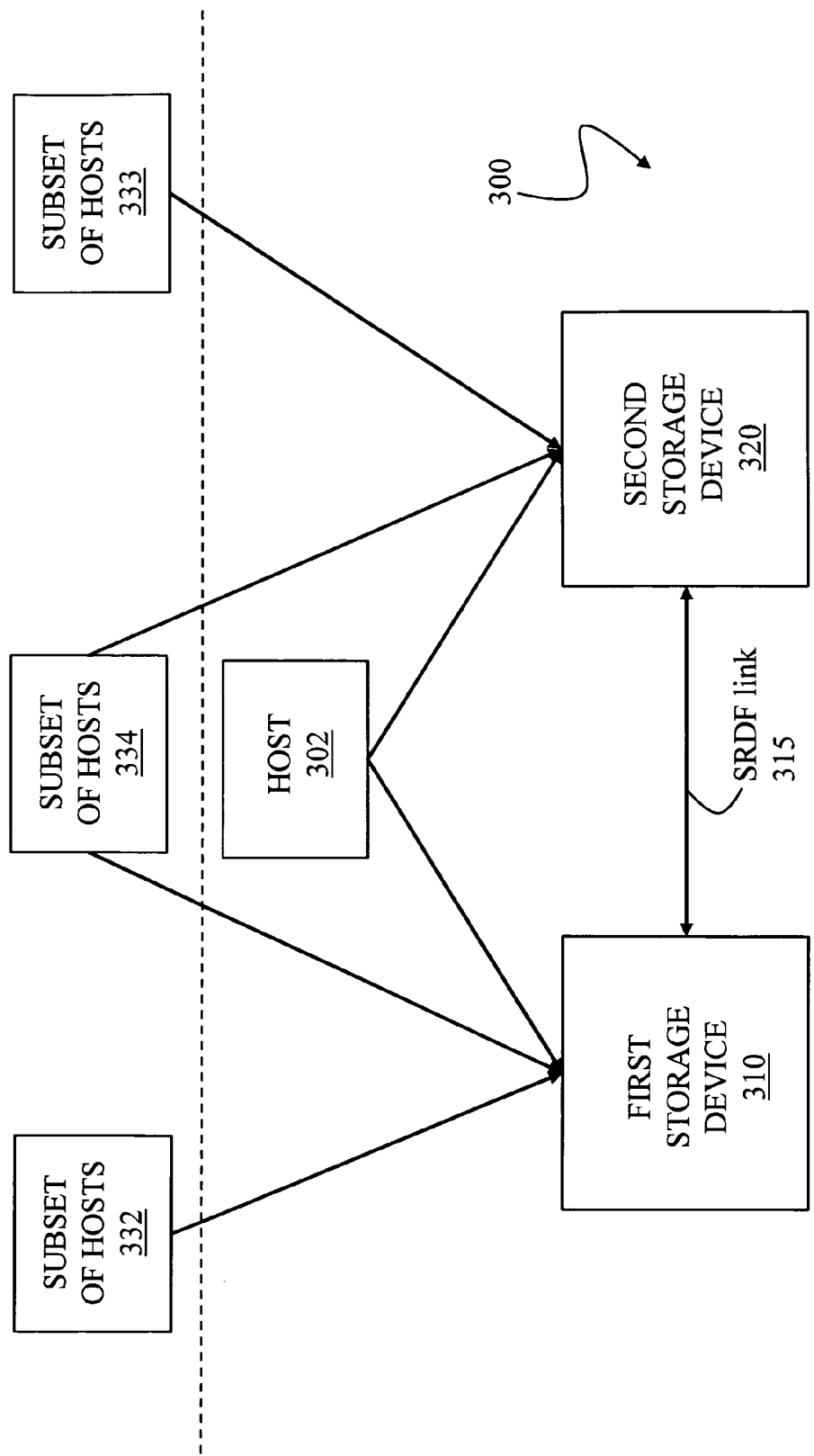
FIG. 5 is a schematic illustration of an active/active mirroring system according to another embodiment of the system described herein.

FIG. 5 is a schematic illustration of an active/active mirroring system 300, for example an active/active SRDF system, according to another embodiment of the system described herein. The system 300 may include a host 302 coupled to a first storage device 310 and a second storage device 320. In an embodiment, the system described herein provides for multiple storage locations to be treated as a single location to the host 302 even as data at the locations is being replicated, as further discussed elsewhere herein. The system described herein provides for uninterrupted service in the event of failure of a storage volume, by providing automatic failover (e.g., automatic autoswap) of the host from the failed storage device to the working storage device.

In connection with the system described herein, software may be used to facilitate selection of alternative I/O paths. For example, an EMC product called Powerpath provides automated load balancing and non-disruptive path management, allowing selection of alternative I/O paths. The software, provided on a computer-readable medium, may be configured to recognize the first storage device 310 and the second storage device 320 as the same storage device. In the event of failure of the one of the storage devices, the host 302 may continue I/O operations on the working device without interruption and may be unaware of the failure. The SRDF link 315 between the storage devices 310, 320 allows data written on either one of the storage devices to be mirrored to the other storage device in accordance with the system described herein.

FIG. 5 shows the host 302 coupled to the first storage device 310 and to the second storage device 320. However, in other embodiments, a plurality of subsets of hosts 332-334 may be coupled to any combination of the first and/or the second storage devices 310, 320. Thus, for example, the subset of hosts 332 may be coupled to only the first storage device 310, the subset of hosts 333 may be coupled to only the second storage device 320, and the subset of hosts 334 may be coupled to both of the storage devices 310, 320. Generally, each of the subsets 332-334 may contain any number of hosts (including zero or one). Of course, at least one of the subsets 332-334 contains at least one host.

Figure 6:
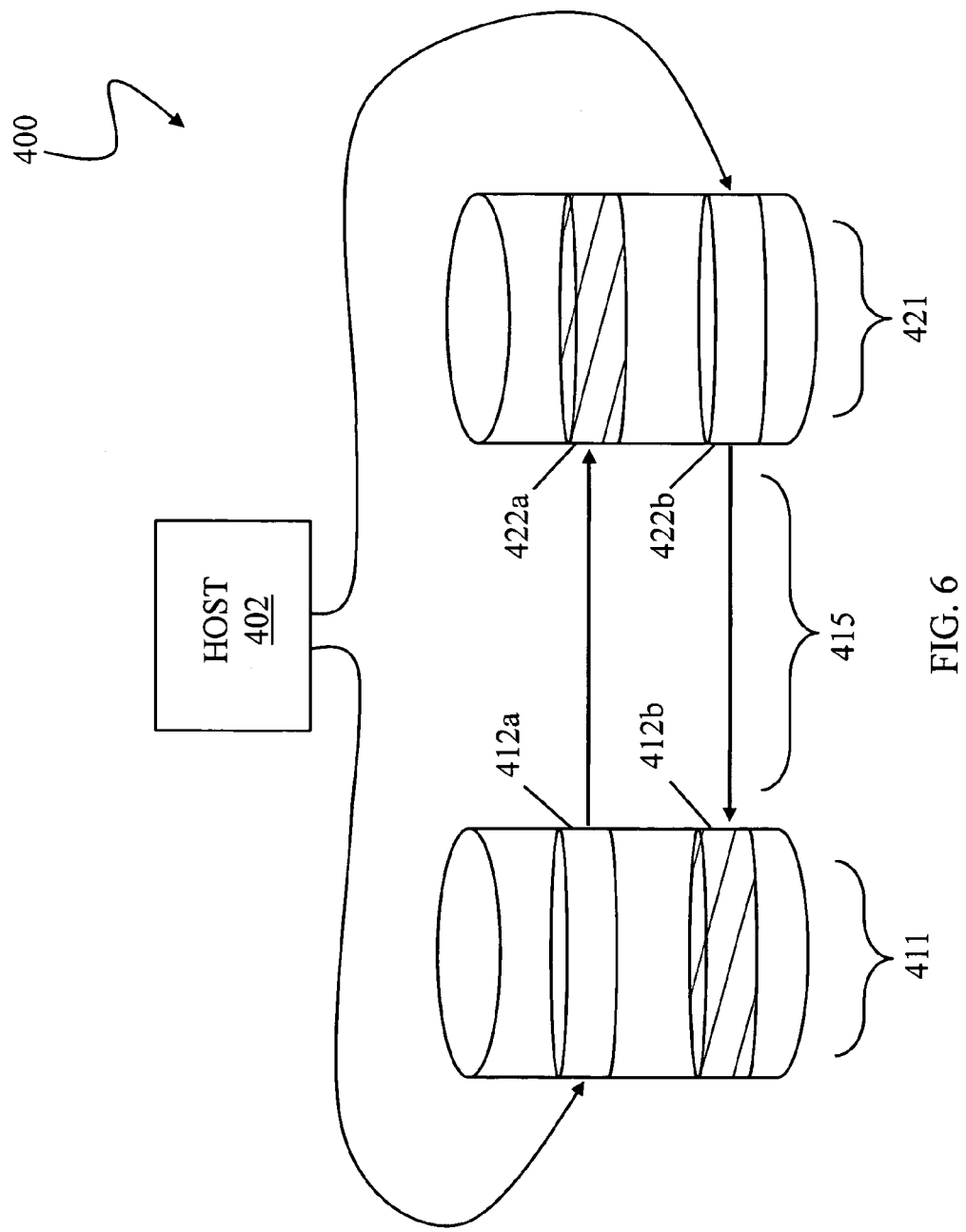
FIG. 6 is a schematic illustration of an active/active mirroring system according to another embodiment of the system described herein showing operation using portions of storage volumes.

FIG. 6 is a schematic illustration of an active/active mirroring system 400, for example an active/active SRDF system, according to another embodiment of the system described herein, showing operation using portions of storage volumes. A storage volume 411 and another storage volume 421 may be storage volumes on the first storage device 310 and/or the second storage device 320, and, for example, may include logical and/or physical volumes. The storage volumes 411, 412 may be coupled by an SRDF link 415 in accordance with the system described herein. A host 402 is schematically shown coupled to the storage volumes 411, 412 for conducting I/O operations with respect thereto. The host 402 may conduct I/O operations with respect to a portion 412a of the volume 411 and the host 402 may conduct I/O operations with respect to a portion 422b of the volume 421. In accordance with the system described herein, the portion 412a-on the volume 411 may be mirrored using SRDF and the SRDF link 415 to a portion 422a on the volume 421. Similarly, the portion 422b on the volume 421 may be mirrored using SRDF and the SRDF link 415 to a portion 412b on the volume 411. Accordingly, from an SRDF perspective, each of the volumes 411, 421 is active; however, with respect to the portions of the volumes 411, 421, the portions 412a, 421b are active while the portions 421a, 412b are passive, being mirrors of the active portions 412a, 421b. Note, however, that generally, the portions 412a, 412b may be completely separate, may partially overlap, and/or may be identical (completely overlap).

Note also that, as illustrated in FIG. 5 and discussed above, any number of hosts coupled to any combination of the volumes 411, 421 may be used. There may be some hosts coupled to both of the volumes 411, 421 (like the host 402 in FIG. 6), some hosts coupled to just the volume 411, and/or some hosts coupled to just the volume 421. Accordingly, the description for FIG. 6 should be understood as including any number of hosts coupled to the volumes 411, 421 in any appropriate combination. Thus, even though each of the volumes 411, 421 may receive writes from any host or combination of hosts, the writes are processed essentially the same irrespective of whether the writes were first provided to the volume 411 or to the volume 421.

Note also that, with multiple storage devices, there may be issues relating to write pending granularity in which different blocks in the same sector are accessed from different storage devices. This may be addressed by providing block granularity, where there is a separate write pending indicator for each block. Note that providing write pending granularity at the block level may further decrease link usage through better de-duplication processes, in which unnecessary duplicate data on a storage device may be eliminated.

Figure 7:
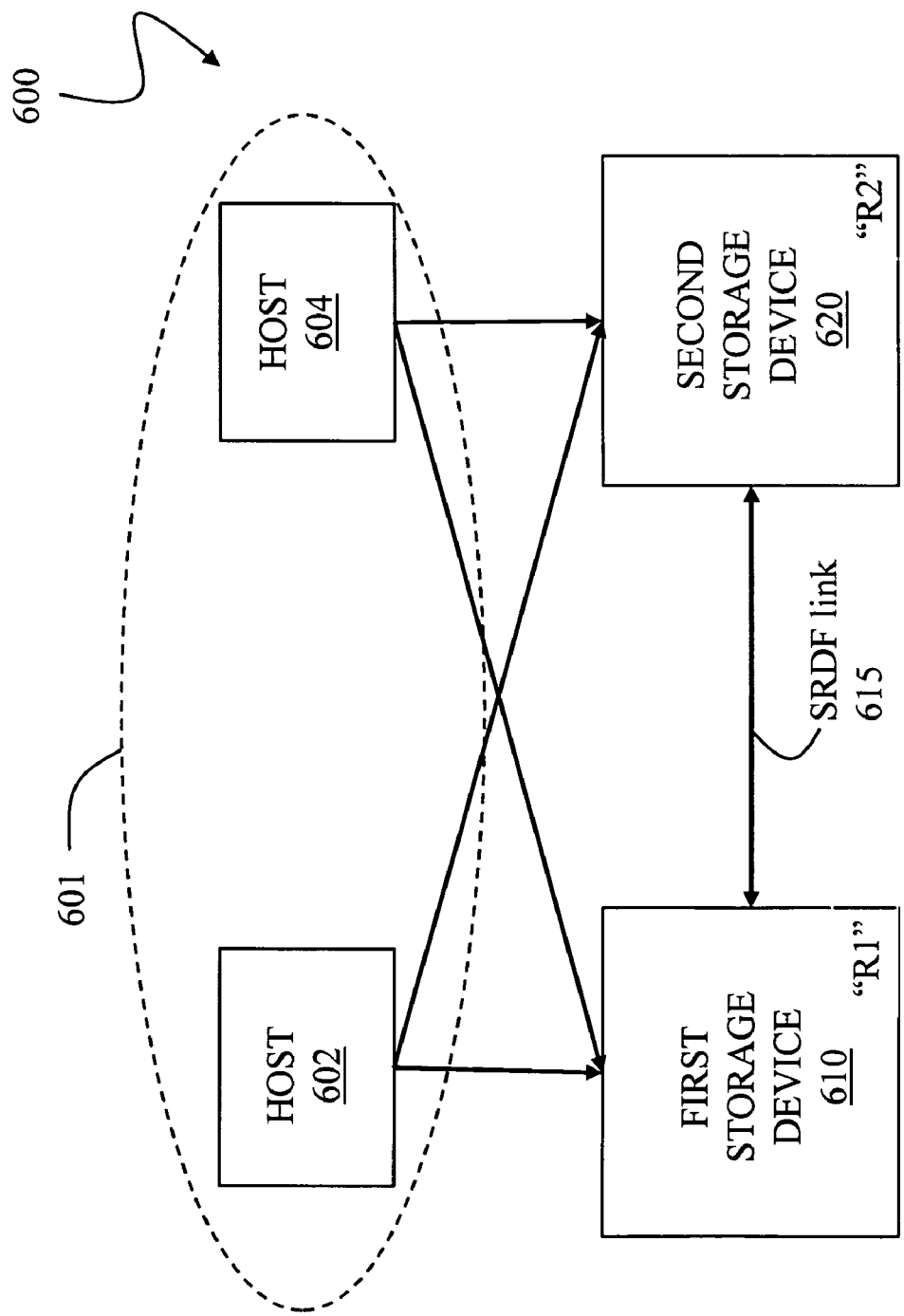
FIG. 7 is a schematic illustration showing polarization operation for an active/active mirroring system, such as an active/active SRDF system, according to an embodiment of the system described herein.

FIG. 7 is a schematic illustration showing polarization operation for an active/active mirroring system 600, such an active/active SRDF system, according to an embodiment of the system described herein. Hosts 602, 604 that may be part of an application cluster 601 are shown coupled to a first storage device 610 and a second storage device 620, which are coupled via an SRDF link 615. Each of the storage devices 610, 620 may be pre-designated with a particular polarity as either an R1 volume or an R2 volume. For example, the first storage device 610 is shown with "R1" polarity and the second storage device 620 is shown with "R2" polarity. During normal operation, the polarity of the storage devices 610, 620 does not affect operation. In the event of a link break and/or other event that leads to breaking of symmetry between the multiple storage devices 610, 620, the storage devices 610, 620 that were in active/active operation are polarized and assume their designated polarity as either an R1 volume or an R2 volume. For example, any of the hosts/applications 602, 604, in the applications cluster 601 that were conducting I/O operations with the now-designated R2 volume (second storage device 620), may be directed to failover to the R1 volume (first storage device 610). In addition, as described in more detail elsewhere herein, the designated polarity may be used to resolve potential deadlock (lock conflict) situations.

Accordingly, with the illustrated embodiment, in the event of breaking of symmetry between the storage devices 610, 620, the system described herein provides the preservation of at least one viable data center. Both storage devices 610, 620 may remain consistent following the failure and avoid scenarios that may be involved in the case of a lost SRDF link where the hosts 602, 604 may continue to write to the devices 610, 620 as if the devices were a single device, when, in fact, the devices 610, 620 are no longer coupled in that manner.

The designated polarity may be used to address technical and/or other conflict issues that may occur during active/active SRDF operation, such as potential deadlocks (lock conflicts) when a same resource and/or set of resources (e.g., tracks, sectors, blocks) is accessed by more than one of the storage devices. This may be addressed by a random back-off and retry approach (e.g., by the device having a designated R2 polarity) in accordance with the system described herein. If the device having a designated R2 polarity (R2) determines that the device having a designated R1 polarity (R1) has locked a resource on which R2 needs access, then R2 will release all resources obtained by R2 for the I/O operation and try again later to access the resource and conduct the I/O operation. Note that, in some instances, the R1 resource may be unlocked (e.g., the R1 track, sector, block, etc. may be unlocked) before received status information from R2. Thus, for example, R1's lock on a track may be released before receiving acknowledgement from a corresponding R2 and before an acknowledgement is sent to the host in accordance with the SRDF operations discussed elsewhere herein.

Figure 8:
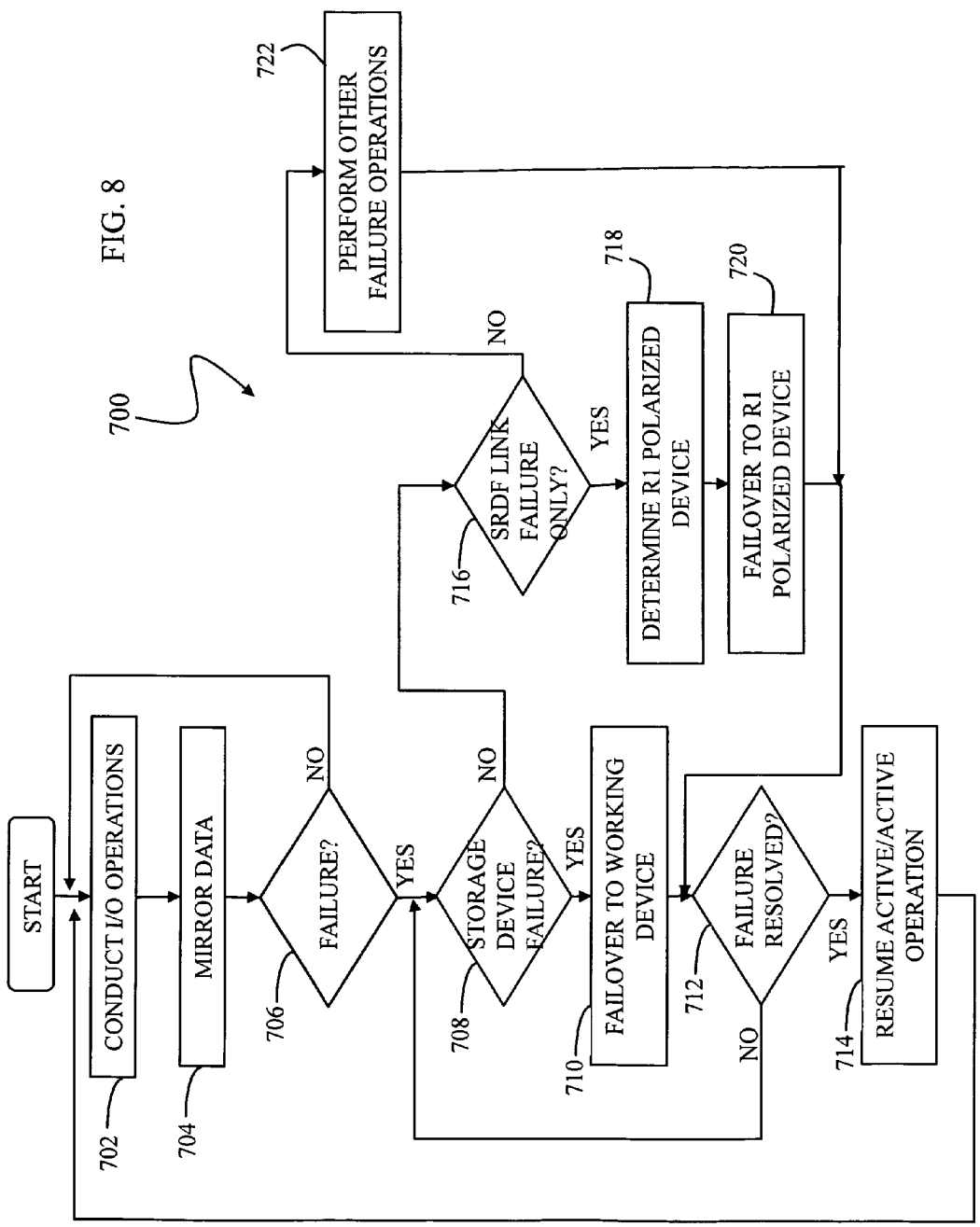
FIG. 8 is a flow diagram showing active/active operation of a storage system, such as SRDF, according to an embodiment of the system described herein.

FIG. 8 is a flow diagram 700 showing active/active operation of a storage system, such as SRDF, according to an embodiment of the system described herein. At a step 702, a host, such as one of the hosts 602, 604, may conduct I/O operations involving an active first storage device and an active second storage device, such as the first storage device 610 and the second storage device 620 as discussed elsewhere herein. According to the system described herein, the I/O operations may be made to the first storage device and/or the second storage device and may include operations using SRDF/S and/or other appropriate operation. The storage devices may include physical devices, logical devices, and/or portions thereof. For example, the host may be one or more individual applications and/or servers and/or may be part of a cluster. After the step 702, processing proceeds to a step 704 where the I/O operations, e.g., writes, made to the first storage device or the second storage device are mirrored to the other of the devices using, for example, SRDF with an SRDF link between the storage devices such as the SRDF link 615, as discussed elsewhere herein.

After the step 704, processing proceeds to a test step 706 where it is determined if a failure has occurred in the system. If a failure has occurred, then processing proceeds to a test step 708 where it is determined whether the failure is to one of the storage devices. If so, then processing proceeds to a step 710 where a failover process is initiated for any host working with the failed storage device to failover to the working storage device for continued operations. After the step 710, processing proceeds to a test step 712 where it is determined whether the failure that occurred is resolved and/or otherwise over. If not, then processing may proceed back to the test step 708. If the failure is resolved, then processing proceeds to a step 714 where the active/active operation of the storage devices are resumed in accordance with the system described herein. In the step 714, it may be necessary to resynchronize the R1 and R2 devices if data for the same tracks is different between the devices. Resynchronization may be performed using the polarity designation, as discussed elsewhere herein, in which differences between the same track defaults to the data from the designated R1 volume and/or synchronization may be accomplished using other more sophisticated synchronization mechanisms as provided, for example, by synchronization software solutions separately or in combination with the polarization processes discussed herein. After the step 714 processing may proceed back to the step 702.

If at the test step 708, it is determined that the failure is not with a storage device, then processing proceeds to a test step 716 where it is determined if the failure is only with the SRDF link between the storage devices, for example, and not involving failure of the network and/or other links of the hosts to the storage devices. If the failure is only with the SRDF link, then processing proceeds to a step 718 where the storage device having a predesignated R1 polarity is determined, as further discussed elsewhere herein. After the step 718, processing proceeds to a step 720 where failover occurs to direct any hosts that were conducting I/O operations with respect to the R2-polarized device to instead conduct I/O operations on the R1-polarized device. In some embodiments, the processing at the step 720 simply involves failing host I/O operations until the link is restored without providing any active direction to any hosts. For such a case, the host may, upon rejection of I/O operations from the R2-polarized device, redirect I/O operations to the R1-polarized device. In other embodiments, there may be a mechanism to actively redirect I/O operations of one or more hosts to use a non-failing link (not the failed SRDF link) to perform I/O operations directly using the R1-polarized device. After the step 720, processing proceeds back to the test step 712.

If at the test step 716, it is determined that the failure is not only with the SRDF link then processing proceeds to a step 722 where other failure operations are conducted. For example, if the failure is a network failure then other failure operations may include holding and/or ceasing operations of the host. Alternatively, if the failure conditions allow and if needed, each of the hosts may continue to locally conduct I/O operations to the nearest storage devices. When normal active/active operation resumes (see the step 714), in the event hosts have locally conducted I/O operations on storage devices and conflicts and/or other differences exist between the data on the storage devices, such conflicts and/or differences may be resolved in accordance with the polarization procedures discussed elsewhere herein. After the step 722, processing may proceed back to the test step 712.

FIG. 9 is a flow diagram 800 showing lock conflict resolution in an active/active mirroring system according to an embodiment of the system described herein. At a step 802, a host, such as one of the hosts 602, 604, may initiates I/O operations involving an active first storage device and an active second storage device, such as the first storage device 610 and the second storage device 620 as discussed elsewhere herein. According to the system described herein, the I/O operations may be made to the first storage device and/or the second storage device and may include operations using SRDF/S and/or other appropriate operations. After the step 802 processing proceeds to a test step 804 where it is determined if a conflict exists with the initiated I/O operations, such as a deadlock issue or other conflict-related failure and/or problem, as further discussed elsewhere herein. If a conflict exists, then processing proceeds to a step 806 where the volume having the pre-designated R1 polarity is determined, as further discussed elsewhere herein. After the step 806, processing proceeds to a step 808 where the conflict is resolved in accordance with the polarity determination of the step 806. After the step 808, processing proceeds to a step 810 where the I/O operations are conducted. After the step 810, processing proceeds back to the step 802. If no conflict exits at the test step 804, then processing proceeds directly to the step 810.

The active/active SRDF system described herein offers federated consistency advantages including: consistency between internal (e.g., C:) drives and external drives; consistency between virtualized applications; and consistency between virtualized and non-virtualized applications. With SRDF, the host CPU may not be required to perform operations for mirroring and migration of data. The system described herein may provide for high availability, including load balancing features, and active/active clustering and may provide for logical volume management (LVM) without the requirement for external LVM devices. Further, as discussed elsewhere herein and according to the system described herein, with active/active SRDF, multiple storage volumes may be used for production and storage capacity rather than having only a local storage volume for production and a remote storage volume for mirroring.

The system described herein may be used in connection with known application cluster systems, clustered file systems and/or server virtualization systems, including, for example, Oracle RAC, VMWare ESX, and VMWare Storage vMotion, among others. The system described herein provides for a high availability, high performance, enterprise-wide SRDF based solution.

Various embodiments discussed herein may be appropriately combined with each other in connection with the system described herein. Further, the system described herein may be implemented using software, hardware, and/or a combination of software and hardware where software and/or executable code may be stored in an appropriate storage medium and executed by one or more processors.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An active/active mirroring system, comprising:
a first storage device; and
a second storage device coupled to the first storage device, wherein the first storage device is accessible for first I/O operations by at least one first host, and the second storage device is accessible for second I/O operations by at least one second host, the at least one first host being the same as or different from the at least one second host, wherein the first I/O operations include a first write request from the at least one first host that is received at the first storage device, wherein the second I/O operations include a second write request from the at least one second host that is received at the second storage device, the first write request being independent of the second write request, and wherein the first storage device and the second storage device control mirroring operations that synchronously mirror data between each of the first storage device and the second storage device, wherein, in connection with a polarization operation, one of the first storage device or the second storage device is designated as a primary-polarity storage device and the other of the first storage device or the second storage device is designated as a secondary-polarity storage device, and, wherein, in response to a lock conflict between the first storage device and the second storage device, the lock conflict is resolved by an action of the secondary-polarity storage device.

2. The active/active mirroring system according to claim 1, wherein the at least one first host and the at least one second host are part of a cluster.

3. The active/active mirroring system according to claim 1, wherein there are a plurality of hosts and wherein at least one of the hosts is coupled to only one of: the second storage device and the first storage device.

4. The active/active mirroring system according to claim 1, wherein at least a first portion of the first storage device receives the first I/O operations from the at least one first host, and wherein at least a second portion of the first storage device includes mirrored data received from the second storage device.

5. The active/active mirroring system according to claim 4, wherein at least a first portion of the second storage device receives the second I/O operations from the at least one second host, and wherein at least a second portion of the second storage device includes mirrored data received from the first storage device.

6. The active/active mirroring system according to claim 1, wherein, in response to failure of one of the first storage device and the second storage device, a respective one of at least one first host or the at least one second host directs affected I/O operations to the other of the first storage device and the second storage device.

7. The active/active mirroring system according to claim 1, wherein, in response to failure of a communication link between the first storage device and the second storage device, the at least one first host or the at least one second host directs affected I/O operations to the designated primary-polarity storage device.

8. A method for active/active mirroring, comprising:
providing a first storage device;
providing a second storage device coupled to the first storage device;
receiving first I/O operations at the first storage device from at least one first host;
receiving second I/O operations at the second storage device from at least one second host, the at least one first host being the same as or different from the at least one second host, wherein the first I/O operations include a first write request from the at least one first host that is received at the first storage device, wherein the second I/O operations include a second write request from the at least one second host that is received at the second storage device, the first write request being independent of the second write request; and
controlling, using the first storage device and the second storage device, mirroring operations at the first storage device and at the second storage device to synchronously mirror data between each of the first storage device and the second storage device, wherein, in connection with a polarization operation, one of the first storage device or the second storage device is designated as a primary-polarity storage device and the other of the first storage device or the second storage device is designated secondary-polarity storage device, and, wherein, in response to a lock conflict between the first storage device and the second storage device, the lock conflict is resolved by an action of the secondary-polarity storage device.

9. The method according to claim 8, wherein the at least one first host and the at least one second host are part of a cluster.

10. The method according to claim 8, wherein there are a plurality of hosts and wherein at least one of the hosts is coupled to only one of: the second storage device and the first storage device.

11. The method according to claim 8, wherein, in response to failure of one of the first storage device and the second storage device, a respective one of the at least one first host or the at least one second host directs affected I/O operations to the other of the first storage device and the second storage device.

12. The method according to claim 8, wherein, in response to failure of a communication link between the first storage device and the second storage device, the at least one first host or the at least one second host directs affected I/O operations to the designated primary-polarity storage device.

13. Computer software, stored on a non-transitory computer-readable medium, for active/active mirroring, comprising:
executable code that controls a first storage device;
executable code that controls a second storage device coupled to the first storage device;
executable code that receives first I/O operations at the first storage device from at least one first host;
executable code that receives second I/O operations at the second storage device from at least one second host, the at least one first host being the same as or different from the at least one second host, wherein the first I/O operations include a first write request from the at least one first host that is received at the first storage device, wherein the second I/O operations include a second write request from the at least one second host that is received at the second storage device, the first write request being independent of the second write request;
executable code that controls, using the first storage device and the second storage device, mirroring operations at the first storage device and at the second storage device to synchronously mirror data between each of the first storage device and the second storage device; and
executable code that, in connection with a polarization operation, designates one of the first storage device or the second storage device as a primary-polarity storage device and the other of the first storage device or the second storage device as a secondary-polarity storage device, and, wherein, in response to a lock conflict between the first storage device and the second storage device, the lock conflict is resolved by an action of the secondary-polarity storage device.

14. The computer software, stored on the non-transitory computer-readable medium, according to claim 13, wherein, in response to failure of one of the first storage device and the second storage device, executable code directs affected I/O operations of a respective one of the at least one first host or the at least one second host to the other of the first storage device and the second storage device.

15. The computer software, stored on the non-transitory computer-readable medium, according to claim 13, wherein, in response to failure of a communication link between the first storage device and the second storage device, executable code directs affected I/O operations of the at least one first host or the at least one second host to a designated primary-polarity storage device.

* * * * *